United States Patent [19]

Harada

[11] Patent Number: 5,947,097
[45] Date of Patent: Sep. 7, 1999

[54] APPARATUS AND METHOD FOR CONTROLLING INTAKE AIR AMOUNT IN ENGINES THAT PERFORM LEAN COMBUSTION

[75] Inventor: Jun Harada, Mishima, Japan

[73] Assignee: Toyota Jidosha Kabushiki Kaisha, Toyota, Japan

[21] Appl. No.: 08/917,198

[22] Filed: Aug. 25, 1997

[30] Foreign Application Priority Data

Aug. 26, 1996 [JP] Japan .................................. 8-223970

[51] Int. Cl.⁶ ...................................................... F02D 41/14
[52] U.S. Cl. ........................ 123/674; 123/295; 123/399; 123/681; 123/698
[58] Field of Search .................................. 123/399, 478, 123/674, 681, 682, 683, 698, 295

[56] References Cited

U.S. PATENT DOCUMENTS

| | | | |
|---|---|---|---|
| 4,434,768 | 3/1984 | Ninomiya | 123/682 X |
| 5,014,668 | 5/1991 | Klenk et al. | 123/399 |
| 5,146,885 | 9/1992 | Fukuma et al. | 123/478 X |
| 5,150,696 | 9/1992 | Kabasin et al. | 123/698 X |
| 5,746,176 | 5/1998 | Damson et al. | 123/399 X |
| 5,752,485 | 5/1998 | Minowa et al. | 123/399 |

FOREIGN PATENT DOCUMENTS

| | | |
|---|---|---|
| A-63-50641 | 3/1988 | Japan . |
| A-4-203446 | 7/1992 | Japan . |
| A-5-18303 | 1/1993 | Japan . |

*Primary Examiner*—Tony M. Argenbright
*Attorney, Agent, or Firm*—Oliff & Berridge, PLC

[57] ABSTRACT

An apparatus for controlling operation of an engine is disclosed. The apparatus includes a passage for supplying air to the engine and a fuel injection valve. The engine burns air-fuel mixture to produce torque. A valve adjusts the quantity of air supplied to the engine. An ECU actuates the valve based on the driving state of the engine. The ECU feedback controls the air-fuel ratio by altering the position of the valve to prevent torque shocks caused by changes in the air supply. The feedback control employs two correction factors, the first of which is representative of the air-fuel ratio of the mixture, and the second of which is representative of an average deviation of the first factor from a stoichiometric air-fuel ratio value. The air-fuel ratio of the mixture is feedback controlled as a function of both correction factors.

15 Claims, 8 Drawing Sheets

APPARATUS AND METHOD FOR CONTROLLING INTAKE AIR AMOUNT IN ENGINES THAT PERFORM LEAN COMBUSTION

BACKGROUND OF THE INVENTION

1. Field of the Invention

The present invention relates to an apparatus for controlling combustion in engines, and more particularly, to an apparatus for controlling the intake air amount when performing lean combustion in engines.

2. Description of the Related Art

In a typical engine, fuel is injected toward an intake port from a fuel injection valve. The fuel is uniformly mixed with air and then sent into the combustion chambers. In such an engine, an air intake passage is opened and closed by a throttle valve, which is operated in accordance with the manipulation of an acceleration pedal. The movement of the throttle valve adjusts the amount of air that is drawn into the intake port to be uniformly mixed with the fuel. The air-fuel mixture is then sent into the combustion chamber. The engine power is controlled in this manner.

The above engine is a type of engine that performs so-called uniform charge combustion. In such type of engine, the closing action of the throttle valve in the intake passage produces a large negative pressure and increases pumping loss. To cope with such problems, engines that perform so-called stratified charge combustion have been proposed. When performing stratified charge combustion, the throttle valve is widely opened and the fuel is directly injected into each combustion chamber. This causes the air-fuel mixture concentrated about the ignition plug to have a low air-fuel ratio, which enhances the ignitability of the mixture at this part of the combustion chamber.

When the engine load is small, stratified charge combustion is performed by concentrating the injected fuel about the ignition plug and completely opening the throttle valve. This increases fuel efficiency and decreases pumping loss. When the engine load is great, the throttle valve is opened and closed in accordance with the depressed amount of the acceleration pedal. Furthermore, the amount of injected fuel is feedback controlled.

There is also a type of engine that performs lean combustion. Japanese Unexamined Patent Publication No. 5-18303 describes lean combustion. When performing lean combustion, the ratio of fuel in the mixture is decreased. During acceleration or under similar conditions, the ratio of fuel is increased to perform combustion at a stoichiometric air-fuel ratio. The stoichiometric air-fuel ratio is feedback controlled.

Figure 9:
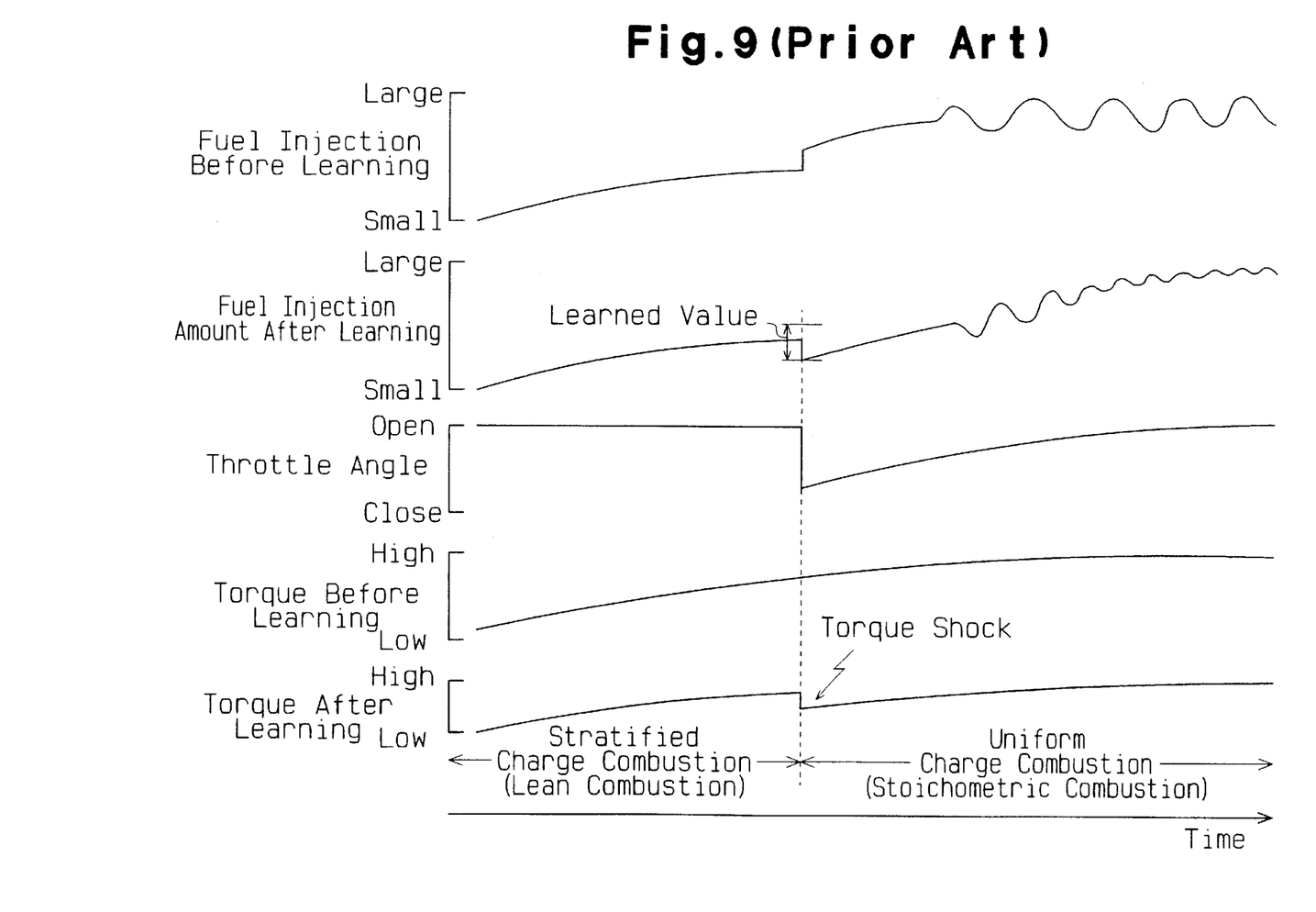
FIG. 9 is a timing chart showing the relationship of the intake fuel amount, the target throttle angle, and torque with respect to time in the prior art.

In each of the above types of combustion, changes in the operating state of the engine (for example, when the engine load increases) causes the engine to switch from stratified charge combustion to uniform charge combustion, or from lean control to stoichiometric control, as shown in FIG. 9. When performing uniform charge combustion or stoichiometric control, the amount of fuel injection is feedback controlled so that the air-fuel ratio becomes stoichiometric.

However, if the amount of intake air fluctuates, for example, when the throttle valve becomes clogged or when the dimensions of the tappet clearance changes, the amount of the injected fuel must be corrected accordingly to maintain the stoichiometric air-fuel ratio. Under such conditions, the value of the corrected fuel injection amount is learned by a computer. Thus, when the engine switches from stratified charge combustion to uniform charge combustion or from lean control to stoichiometric control, the amount of injected fuel is controlled in accordance with the learned value. This may cause a sudden change in the amount of injected fuel and may produce a torque shock.

SUMMARY OF THE INVENTION

Accordingly, it is an objective of the present invention to provide an intake air amount control apparatus for lean combustion engines that ensures optimal combustion in accordance with the operating state of the engine while also suppressing torque shocks.

To achieve the above objective, the present invention provides an apparatus for controlling operation of a fuel injected internal combustion engine of a vehicle. The engine includes a combustion chamber, an air passage for supplying air to the combustion chamber, and an air flow regulator means for regulating the quantity of air supplied for combustion. The engine burns an air-fuel mixture to produce torque. The apparatus includes an actuation means for actuating the air flow regulator means based on the driving state of the engine to control the supply of air to the engine and a control means for regulating the air-fuel mixture. The control means prevents an abrupt change in the output torque of the engine by altering the quantity of air supplied to the combustion chamber with the actuation means.

In another aspect of the present invention, an apparatus for controlling operation of an internal combustion engine of a vehicle is provided. The engine includes a combustion chamber, an air passage for supplying air to the combustion chamber, a fuel injector for supplying fuel to the combustion chamber, and an air flow regulator means for regulating the quantity of air supplied for combustion. The engine burns an air-fuel mixture to produce torque. The engine has at least a first mode of combustion in which combustion occurs while the air flow regulator means is held in a substantially fully open position to produce a lean air-fuel mixture. The apparatus includes a sensor device, a judging means, and a feedback means. The sensor device detects the nature of the air-fuel ratio of the mixture. The judging means judges whether the mixture is rich or lean based on the detection of the sensor device. The feedback means work in cooperation with the judging means to control the air flow regulator means in a second mode of operation such that the air-fuel ratio is corrected toward a stoichiometric air-fuel ratio. The first and second modes of operation are selected based on the operating state of the engine.

In a further aspect of the present invention, a method for controlling an internal combustion engine is provided. The method includes the steps of mixing air with fuel to be burned in a combustion area of the engine, judging the nature of the air-fuel mixture to be burned, and in at least one mode of operation of the engine, feedback controlling the air-fuel ratio of the mixture to steer the air-fuel ratio of the mixture towards a stoichiometric target air-fuel ratio by altering the quantity of air entering the combustion area.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A first embodiment according to the present invention will hereafter be described with reference to the drawings.

Figure 1:
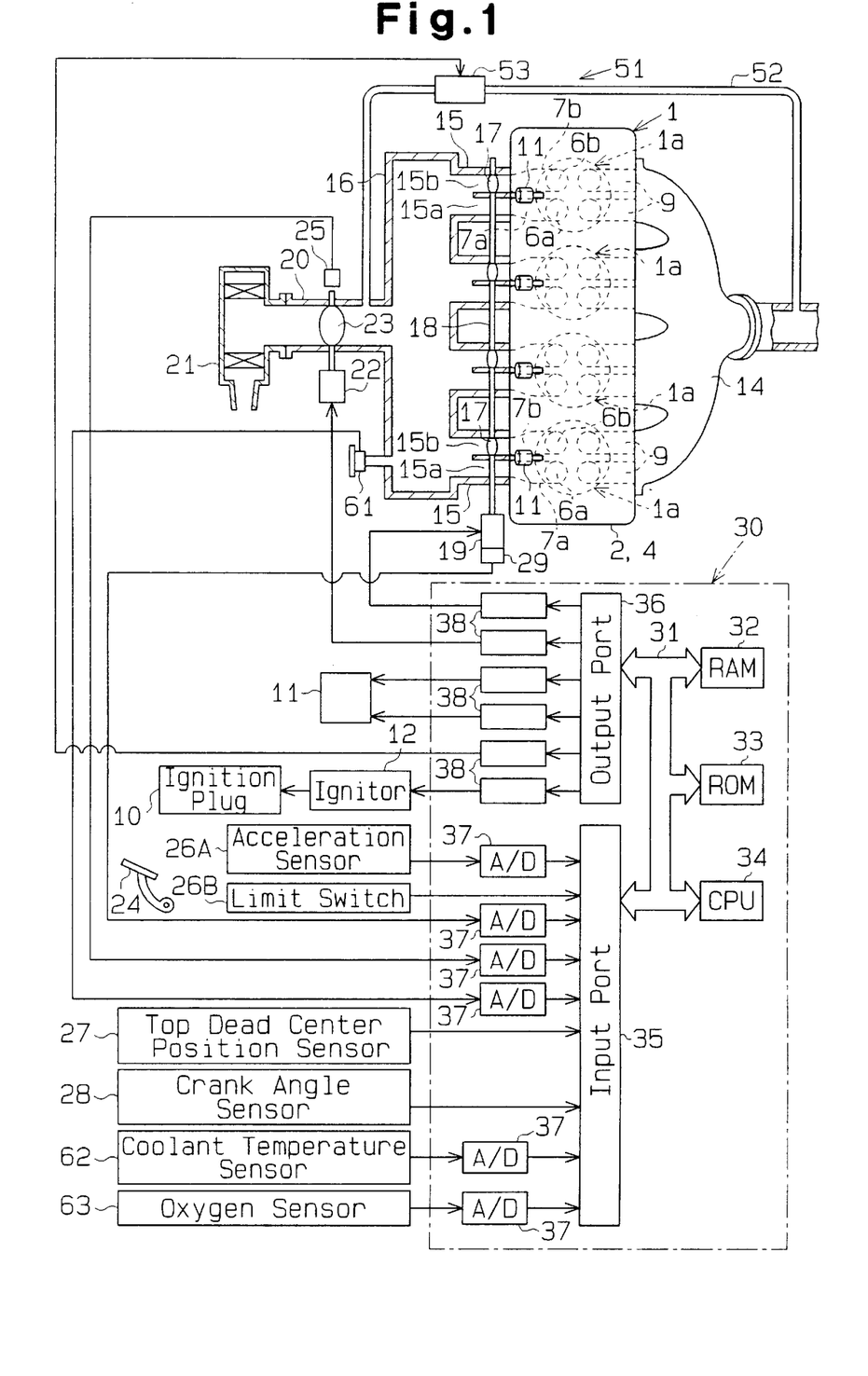
FIG. 1 is a diagrammatic view showing a first embodiment of an intake air amount control apparatus according to the present invention.
Figure 2:
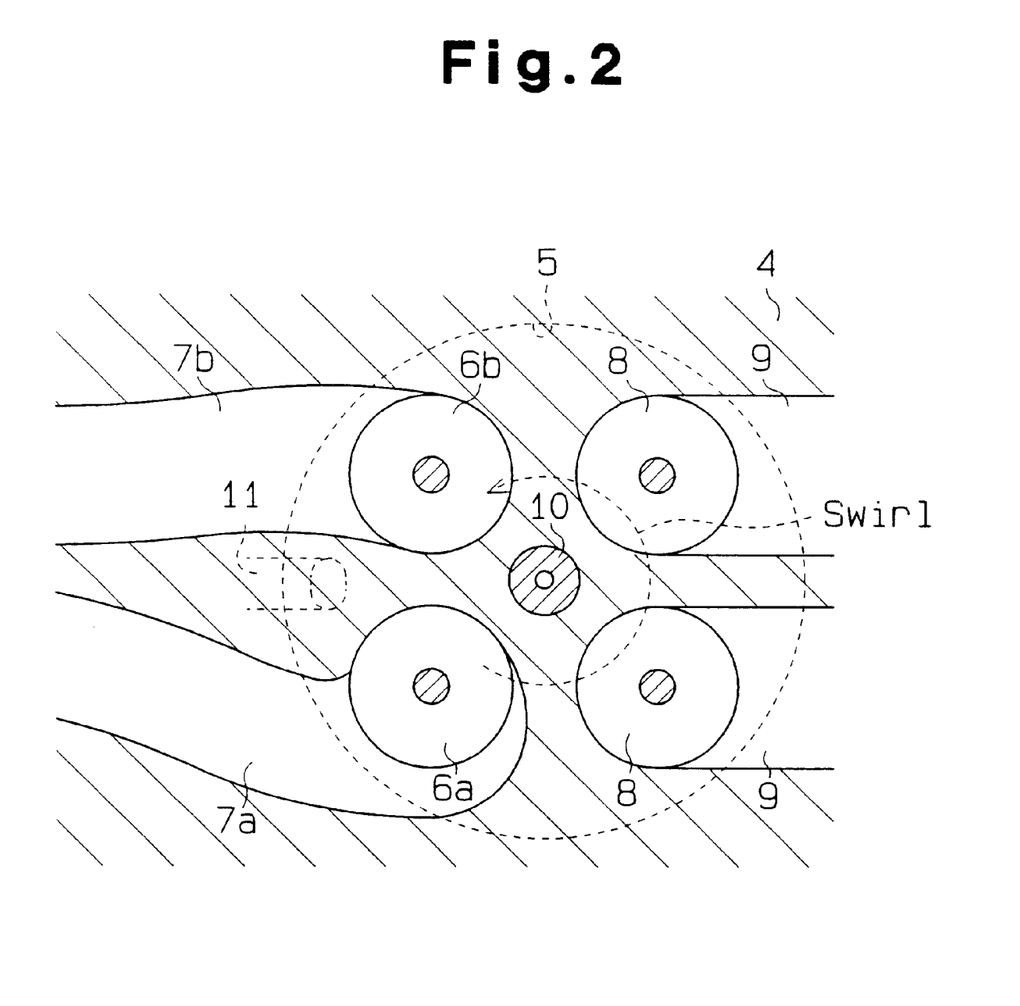
FIG. 2 is a diagrammatic view showing the intake ports of a cylinder.

FIG. 1 shows a fuel injection control apparatus for a cylinder injection type engine that is mounted in an automobile. The engine 1 is provided with four cylinders 1a. The structure of the combustion chamber of each cylinder 1a is shown in FIG. 2. The engine 1 has a cylinder block 2 that accommodates pistons. The pistons are reciprocated in the cylinder block 2. A cylinder head 4 is arranged on top of the cylinder block 2. A combustion chamber 5 is defined between each piston and the cylinder head 4. Four valves (first intake valve 6a, second intake valve 6b, and two exhaust valves 8) are provided for each cylinder 1a. The first intake valve 6a is provided with a first intake port 7a while the second intake valve 6b is provided with a second intake port 7b. Each exhaust valve 8 is provided with an exhaust port 9.

As shown in FIG. 2, the first intake port 7a extends in a helical manner. The second port 7b extends in a generally straight manner. An ignition plug 10 is provided at the middle of the cylinder head 4 for each combustion chamber 5. High voltage is applied to each ignition plug 10 by an ignitor 12 though a distributor (not shown). The ignition timing of the ignition plugs 10 is determined by the output timing of the high voltage sent from the ignitor 12. A fuel injection valve 11 is arranged near the inner wall of the cylinder head at the vicinity of the first and second intake valves 6a, 6b. The fuel injection valve 11 is used to inject fuel directly into the cylinder 1a.

As shown in FIG. 1, the first and second intake ports 7a, 7b of each cylinder 1a are connected to a surge tank 16 by a first intake passage 15a and a second intake passage 15b, which are defined in an intake manifold 15. A swirl control valve 17 is arranged in each second intake passage 15b. The swirl control valves 17 are connected to a step motor 19 by a common shaft 18. The step motor 19 is controlled by signals sent from an electronic control unit (ECU) 30. The step motor 19 may be replaced by an actuator controlled by the negative pressure in the intake ports 7a, 7b.

The surge tank 16 is connected to an air cleaner 21 through an intake duct 20. A throttle valve 23, which is opened and closed by a step motor 22, is arranged in the intake duct 20. The ECU 30 controls the throttle valve 23 by means of the step motor 22. The throttle valve 23 adjusts the amount of intake air that passes through the intake duct 20 and enters the combustion chambers 5.

A throttle sensor 25 is arranged in the vicinity of the throttle valve 23 to detect the opening angle (throttle angle TA) of the valve 23. The exhaust ports 9 of each cylinder 1a are connected to an exhaust manifold 14. After combustion, the exhaust gas is sent to an exhaust duct through the exhaust manifold 14.

The engine 1 is provided with a conventional exhaust gas recirculation (EGR) mechanism 51, which includes an EGR passage 52 and an EGR valve 53 arranged in the EGR passage 52. The EGR passage 52 connects the exhaust duct to the intake duct 20 at the downstream side of the throttle valve 23. The EGR valve 53 includes a valve seat, a valve body, and a step motor (none of which are shown). The opening area of the EGR valve 53 is altered by causing the step motor to intermittently displace the valve body with respect to the valve seat. When the EGR valve 53 opens, some of the exhaust gas sent into the exhaust duct enters the EGR passage 52. The gas is then drawn into the intake duct 20 via the EGR valve 53. In other words, some of the exhaust gas is recirculated by the EGR mechanism 51 and returned to the air-fuel mixture. The recirculation amount of the exhaust gas is adjusted by the opening amount of the EGR valve 53.

The ECU 30 is a digital computer provided with a random access memory (RAM) 32, a read only memory (ROM) 33, a central processing unit (CPU) 34, which is a microprocessor, an input port 35, and an output port 36. A bidirectional bus 31 connects the RAM 32, the ROM 33, the CPU 34, the input port 35, and the output port 36 to one another.

An acceleration pedal 24 is connected to an acceleration sensor 26A. The acceleration sensor 26A generates a voltage proportional to the degree of depression of the acceleration pedal 24, or the depression degree ACCP. The voltage output of the acceleration sensor 26A is sent to the input port 35 in the ECU 30 by way of an analog to digital (A/D) converter 37. The acceleration pedal 24 is also provided with a limit switch 26B, which detects whether the acceleration pedal 24 is completely undepressed. The limit switch 26B sends a signal set at one to the ECU 30 when the acceleration pedal 24 is not depressed and outputs a signal set at zero to the ECU 30 when the acceleration pedal 24 is depressed.

A top dead center position sensor 27 generates an output pulse that is sent to the ECU 30 when the piston in the first cylinder 1a reaches the top dead center position. A crank angle sensor 28 generates an output pulse that is sent to the ECU 30 each time a crankshaft of the engine 1 is rotated by a crank angle CA of 30 degrees. The CPU 34 reads the output pulses of the top dead center position sensor 27 and the crank angle sensor 28 to compute the engine speed NE.

The rotational angle of the shaft 18 is detected by a swirl control valve sensor 29 to measure the opening area of the swirl control valves 17. The signal output from the swirl control valve sensor 29 is sent to the ECU 30.

The throttle sensor 25 detects the throttle angle TA and sends a corresponding signal to the ECU 30.

An intake pressure sensor 61 is provided to detect the pressure in the surge tank 16 (intake pressure PiM). A coolant temperature sensor 62 detects the temperature of the engine coolant (coolant temperature THW). An oxygen sensor 63 provided upstream of a three way catalyst (not shown) arranged in the exhaust passage detects the oxygen concentration OX of the exhaust gas. The output voltage of the oxygen sensor 63 changes in a sudden manner when the air-fuel ratio becomes stoichiometric. The oxygen sensor 63 uses this feature to detect the air fuel ratio A/F. The values detected by the sensors 61, 62, 63 are sent to the ECU 30.

The output port 36 of the ECU 30 is connected to the fuel injection valves 11, the step motors 19, 22, the ignitor 12, and the EGR valve 53 (step motor) by way of corresponding drive circuits 38. The ECU 30 optimally controls the fuel injection valves 11, the step motors 19, 22, the ignitor 12 (ignition plugs 10), and the EGR valve 53 with control programs stored in the ROM 33 based on signals sent from the sensors 25–29, 61–64.

Figure 3:
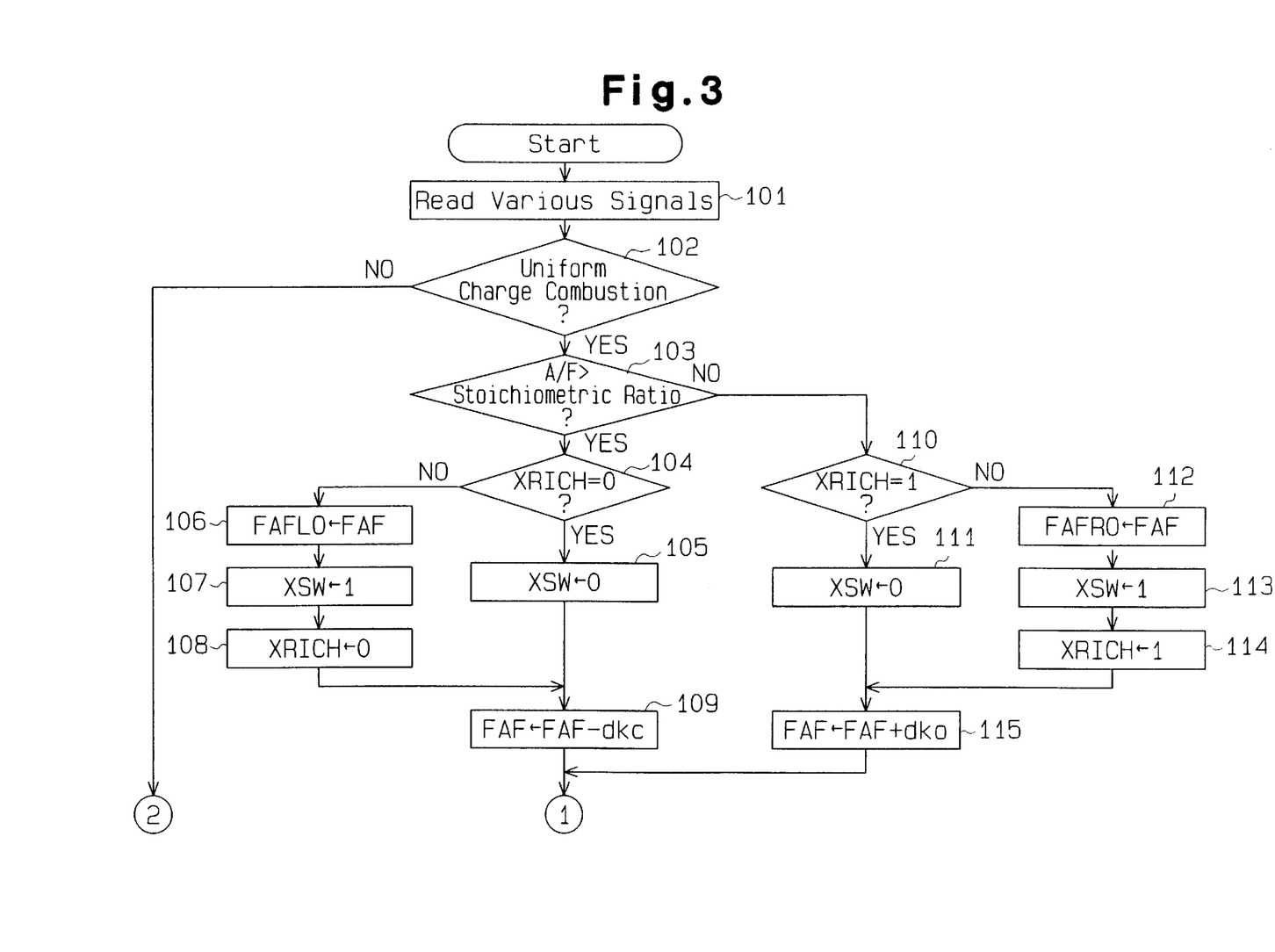
FIG. 3 is a flowchart showing the throttle valve angle control routine executed by the electronic control unit.
Figure 4:
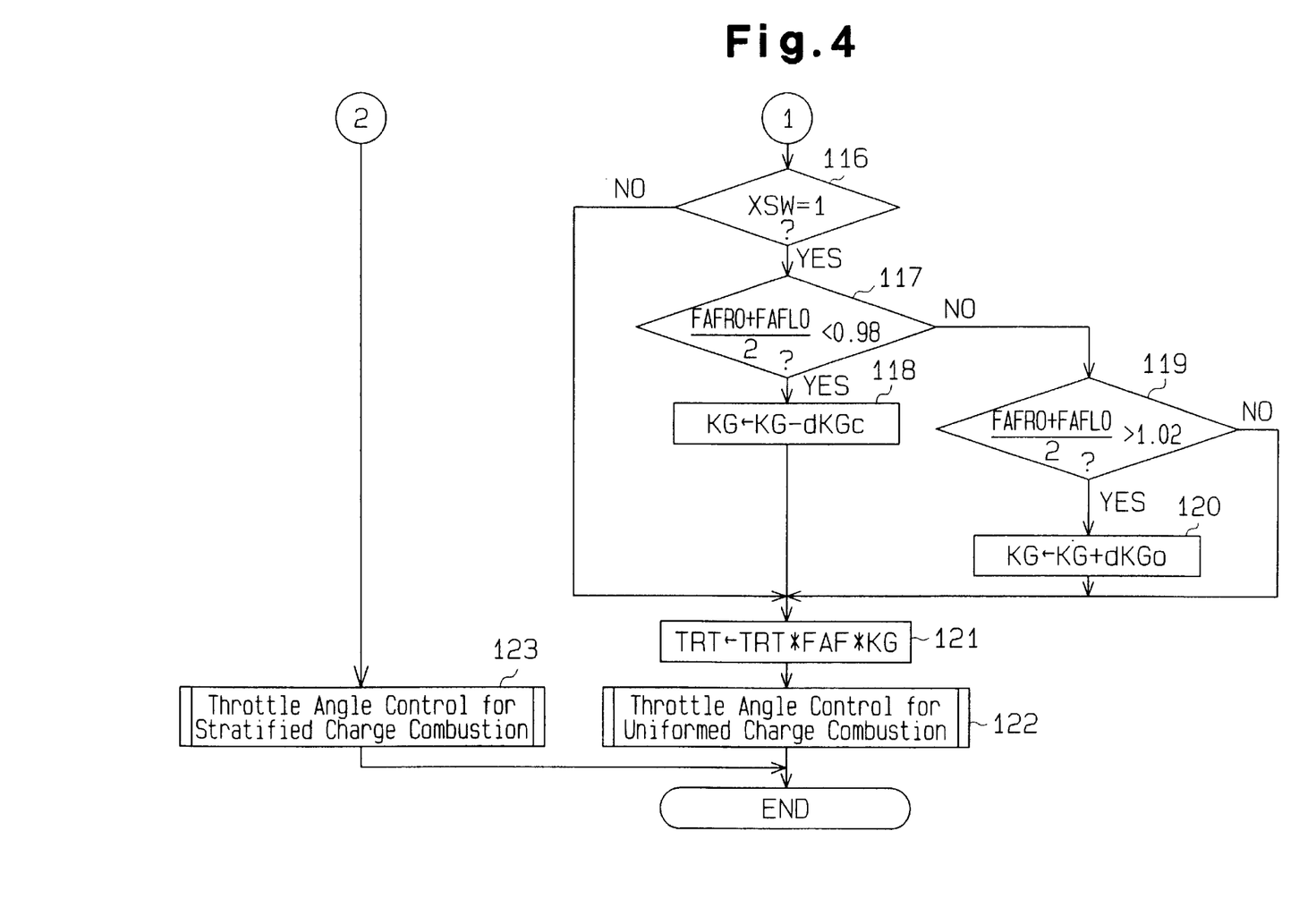
FIG. 4 is a flowchart showing the continuation of the throttle valve angle control routine of FIG. 3.

Control programs stored in the ECU 30 will now be described with reference to the flowchart shown in FIGS. 3 and 4. The flowchart shows a routine for controlling combustion by controlling the throttle valve 23. This routine is executed each time the crankshaft is rotated by a predetermined angle.

When entering this routine, the ECU 30 first reads the signals sent from the sensors 25–29, 61–63. These signals indicate the present operating state of the engine 1 such as the engine speed NE, the depression degree ACCP, and the air-fuel ratio A/F.

At step 102, the ECU 30 determines whether or not the engine 1 is performing uniform charge combustion based on the present engine speed NE, the depression angle ACCP, and other information. The ECU 30 refers to a map (not shown), which indicates the uniform charge combustion range and the stratified charge combustion range with respect to the engine speed NE and the depression angle ACCP. If the ECU 30 determines that the engine 1 is not performing uniform charge combustion, this indicates that the engine 1 is performing stratified charge combustion. In this case, the ECU 30 proceeds to step 123. At step 123, the ECU 30 executes throttle angle control for stratified charge combustion(the throttle valve is substantially completely opened) and temporarily terminates subsequent processing.

If it is determined that the engine 1 is performing uniform charge combustion, the ECU 30 proceeds to step 103 and determines whether or not the present air-fuel ratio A/F is greater than the stoichiometric air-fuel ratio. When the present air-fuel ratio A/F is greater than the stoichiometric air-fuel ratio, that is, when the air-fuel mixture is lean, the ECU 30 proceeds to step 104 and determines whether or not the rich flag XRICH is presently set at zero. The rich flag XRICH indicates whether the air-fuel mixture was rich or lean in the previous cycle of the routine. If the air-fuel mixture was rich, the flag XRICH was set at one. If the air-fuel mixture is lean, the flag XRICH is set at zero. When it is determined that the rich flag XRICH is set at zero, this indicates that the air-fuel mixture was lean in the previous cycle in addition to the present cycle. In this case, the ECU 30 proceeds to step 105 and sets the switching flag XSW to zero, indicating that there has been no change from one cycle to the next. The ECU 30 then proceeds to step 109.

In step 104, if it determined that the rich flag XRICH is set at one, this indicates that the air-fuel mixture was rich in the previous cycle but has switched to a lean state in the present cycle. In this case, the ECU 30 proceeds to step 106 and sets the present feedback coefficient FAF (the value of which is maximum in this state) as the first switch timing value FAFLO (refer to FIG. 5). At step 107, the ECU 30 sets the switching flag XSW to one, indicating a change between consecutive cycles. At step 108, the ECU 30 sets the rich flag XRICH to zero and then proceeds to step 109.

Figure 5:
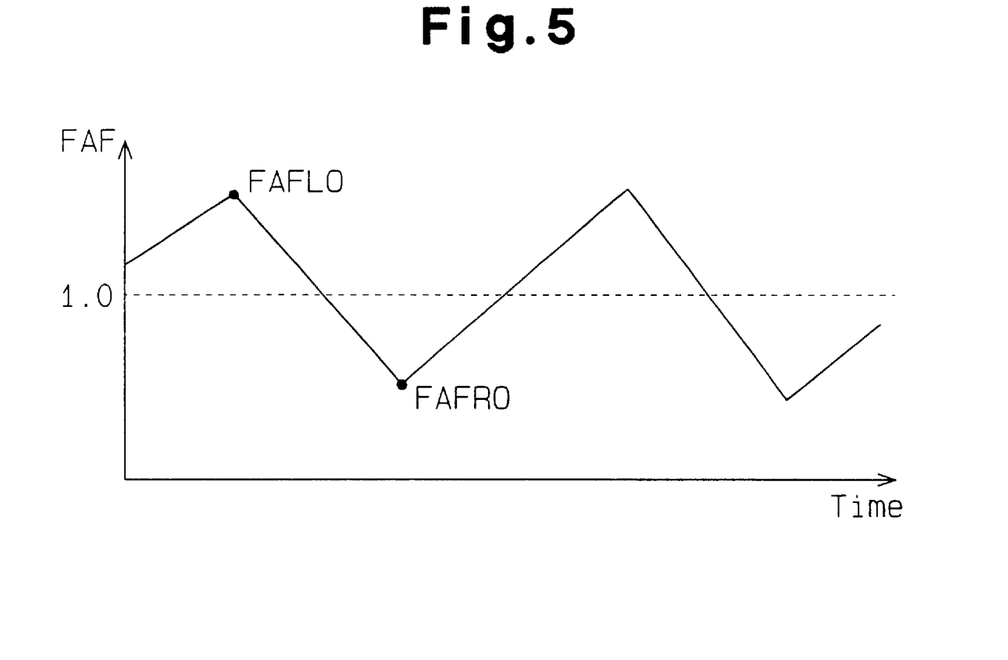
FIG. 5 is a timing chart showing the relationship between the feedback coefficient and time.

At step 109, the ECU 30 subtracts the first correction value dkc from the feedback coefficient FAF and sets the obtained value as the new feedback coefficient FAF to decrease the air-fuel ratio A/F and cause the air-fuel mixture to become richer. This gradually decreases the feedback coefficient FAF, as shown in FIG. 5.

In step 103, if it is determined that the present air-fuel ratio A/F is not greater than the stoichiometric air-fuel ratio, that is, if the air-fuel mixture is rich, the ECU 30 proceeds to step 110. At step 110, the ECU 30 determines whether or not the rich flag XRICH is set at one. When it is determined that the rich flag XRICH is set at one, this indicates that the air-fuel mixture was rich in the previous cycle in addition to the present cycle. In this case, the ECU 30 proceeds to step 111 and sets the switching flag XSW to zero, indicating that there has been no change from one cycle to the next. The ECU 30 then proceeds to step 115.

In step 110, if it determined that the rich flag XRICH is set at zero, this indicates that the air-fuel mixture was lean in the previous cycle but has switched to a rich state in the present cycle. In this case, the ECU 30 proceeds to step 112 and sets the present feedback coefficient FAF (the value of which is minimum in this state) as the second switch timing value FAFRO (refer to FIG. 5). At step 113, the ECU 30 sets the switching flag XSW to one, indicating that there was a change between consecutive cycles. At step 114, the ECU 30 sets the rich flag XRICH to one and then proceeds to step 115.

At step 115, the ECU 30 adds the second correcting value dko to the feedback coefficient FAF and sets the obtained value as the new feedback coefficient FAF to increase the air-fuel ratio A/F and cause the air-fuel mixture to become leaner. This gradually increases the feedback coefficient FAF, as shown in FIG. 5.

The ECU 30 proceeds to step 116 from steps 109 and 115 and determines whether or not the switching flag XSW is set at one. If it is determined that the switching flag XSW is set at zero, then learning will not be carried out and the ECU 30 jumps to step 121. If it is determined that the switching flag XSW is set at one in step 116, then learning is carried out and the ECU 30 proceeds to step 117.

At step 117, the ECU 30 determines whether or not the average value of the present first and second switch timing values FAFLO, FAFRO is smaller than 0.98 (exemplary value). If the average value is smaller than 0.98, the ECU 30 proceeds to step 118 and subtracts a predetermined first renewing value dKGc from the learning value KG. The obtained value is set as the new learning value KG.

When the average value of the present first and second switch timing values FAFLO, FAFRO is 0.98 or greater in step 117, the ECU 30 proceeds to step 119. At step 119, the ECU 30 determines whether or not the average value of the present first and second switch timing values FAFLO, FAFRO is greater than 1.02 (exemplary value). If the average value is greater than 1.02, the ECU 30 proceeds to step 120 and adds a predetermined second renewing value dKGo to the learning value KG. The obtained value is set as the new learning value KG.

In step 119, if the average value is 1.02 or smaller, this indicates that the average value is between 0.98 and 1.02. In this case, the ECU 30 determines that the learning value KG need not be renewed and proceeds to step 121.

When the ECU 30 reaches step 121 from steps 116, 118, 119, or 120, the ECU multiplies the target throttle angle TRT of the previous cycle with the present feedback coefficient FAF and the learning value KG. The obtained value is set as the new target throttle angle TRT. At step 122, the angle of the throttle valve 23 is controlled by means of the actuator 22 in accordance with the newly set target throttle angle TRT (throttle angle control for uniform charge combustion). The ECU 30 then terminates subsequent processing.

In the above routine, feedback control employing the feedback coefficient FAF and learning control employing the learning value KG are applied to the angle control of the throttle valve 23 after the engine 1 switches to uniform charge combustion from stratified charge combustion. Thus, the throttle angle control adjusts the amount of intake air, not the amount of injected fuel.

Figure 6:
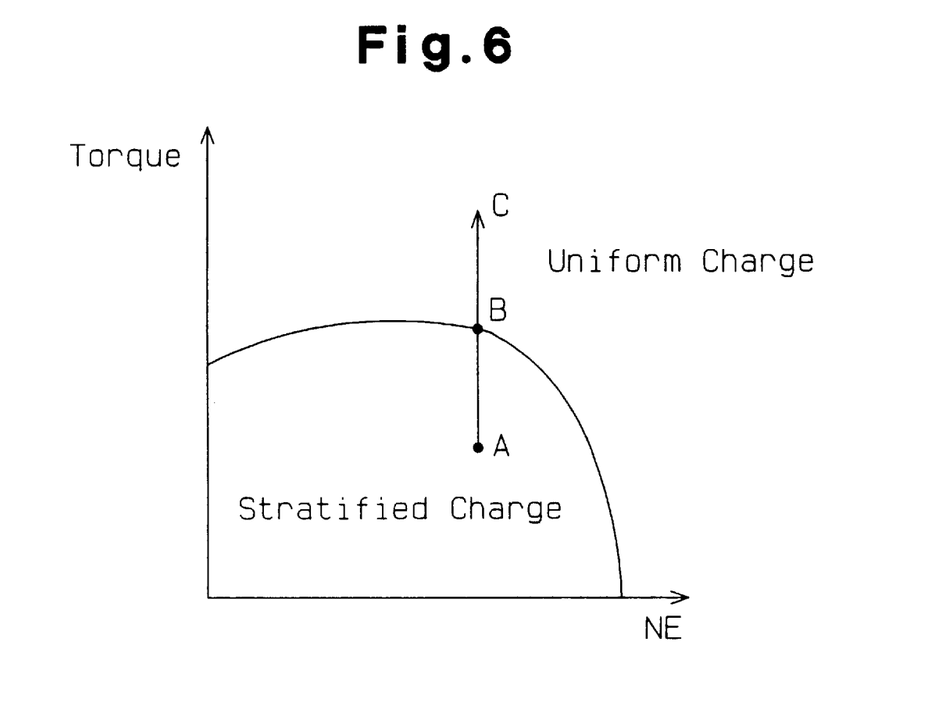
FIG. 6 is a graph showing the boundary of the combustion states with respect to the engine speed and torque.

As shown in FIG. 6, when the engine 1 switches from stratified charge control (point A) to uniform charge control (point C) by way of point B, the throttle angle of the throttle valve 23 is controlled based on the learning value KG. More specifically, the ECU 30 executes learning control so that the feedback coefficient FAF is in the proximity of 1.0. Thus, when fluctuation of the intake air amount occurs due to reasons such as clogging of the throttle valve 23 or changes in the tappet clearance, the ECU 30 controls the throttle angle of the throttle valve 23 to adjust the amount of intake air and maintain the air-fuel mixture at the stoichiometric air-fuel ratio. Changes in the throttle angle of the throttle valve 23 (target throttle angle TRT) are learned as the learning value KG. The learning value KG is then used in the subsequent cycle.

Figure 7:
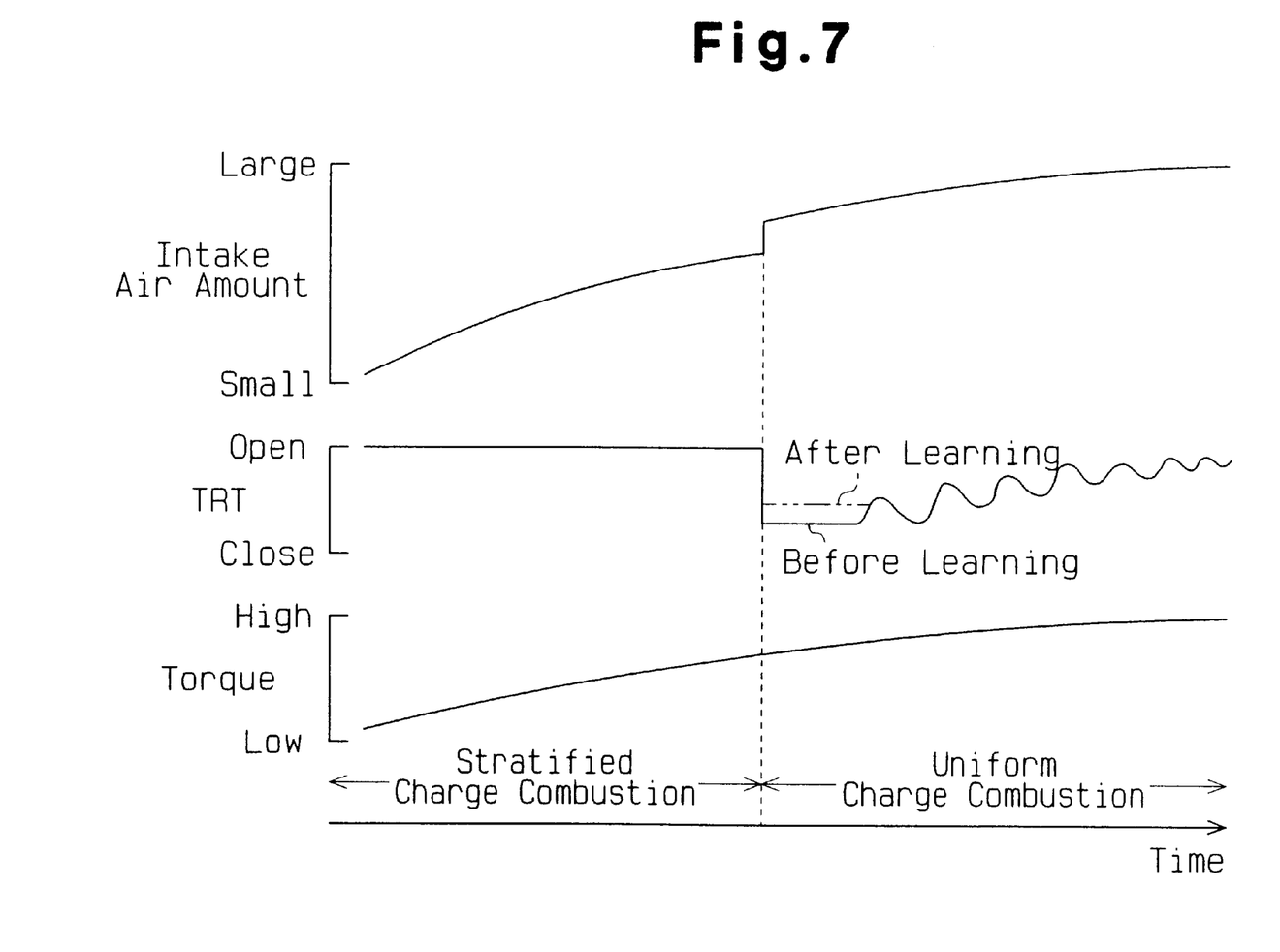
FIG. 7 is a timing chart showing the relationship of the intake fuel amount, the target throttle angle, and torque with respect to time.

In the prior art, changes in the amount of fuel injection were learned. This caused differences in the fuel injection amount, which sometimes resulted in torque shocks. However, in the present invention, such fuel injection control is not carried out. That is, the learning control is applied to the intake air amount control. As shown in FIG. 7, this compensates for the fluctuations in the intake air amount and prevents sudden torque changes. As a result, torque shocks are effectively suppressed.

When performing uniform charge combustion, the air-fuel mixture is stoichiometric. To obtain the stoichiometric air-fuel ratio, the throttle angle (target throttle angle TRT) is feedback controlled based on the feedback coefficient FAF. In other words, the fuel injection amount is not feed back controlled to obtain the stoichiometric mixture as in the prior art. Thus, when the amount of intake air is increased, pumping loss is decreased and torque is enhanced. On the other hand, if the amount of intake air is decreased, the fluctuation of torque is relatively small.

Although only one embodiment of the present invention has been described so far, it should be apparent to those skilled in the art that the present invention may be embodied in many other specific forms without departing from the spirit or scope of the invention. More particularly, the present invention may be modified as described below.

Figure 8:
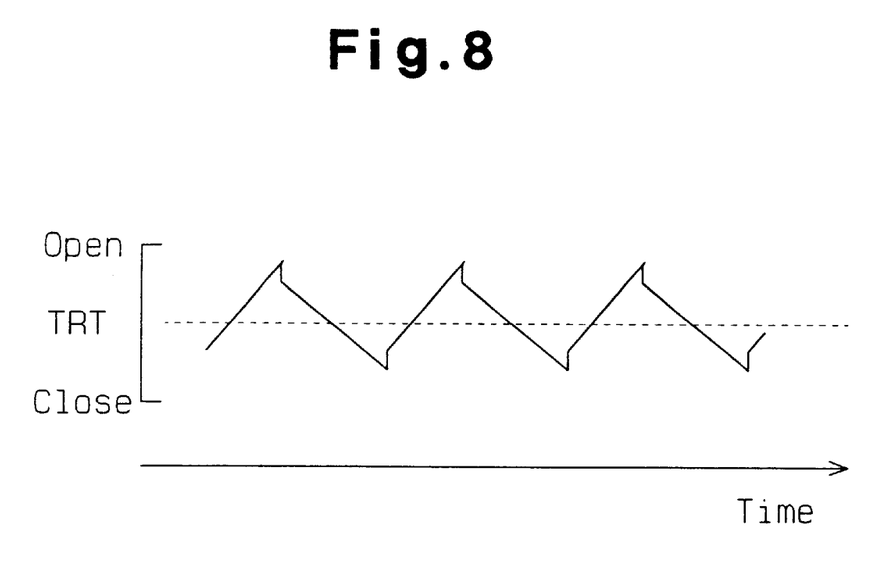
FIG. 8 is a timing chart showing the relationship between time and the target throttle angle in a further embodiment according to the present invention.

(1) As shown in FIG. 8, when burning a stoichiometric air-fuel mixture during uniform charge combustion, conventional integral control and skip control may be executed. In this case, arbitrary values may be used as the skip width and the integral amount. However, the skip width and the integral amount may take values based on functions of the basic throttle angle or the intake air pressure PiM. In this case, it is preferable that the skip width and the integral amount become greater as the basic throttle angle and the intake air pressure PiM become greater.

(2) Instead of controlling the angle of the throttle valve 23 to adjust the intake air amount, the intake air amount may be adjusted by the amount of exhaust gas recirculation (EGR amount), which is adjusted by controlling the opening amount of the EGR valve 53. In this case, it is required that the opening amount of the EGR valve 53 be increased when the air-fuel mixture is lean and decreased when the mixture is rich.

Although not shown in the drawings, an idle speed control (ISC) valve may be provided to control the amount of intake air. In other words, an idle speed control valve may be provided in a passage, which bypasses the throttle valve 23, with an actuator for opening and closing the valve. In this case, the opening amount of the idle speed control valve is controlled to adjust the amount of intake air, which in turn adjusts the air-fuel ratio.

(3) The present invention is not limited to cylinder injection type engines and may be embodied in engines that perform ordinary stratified charge combustion or engines that perform weak stratified charge combustion. For example, the present invention may be applied to an engine that injects fuel beneath the intake valves 6a, 6b provided in the associated intake ports 7a, 7b. The present invention may also be applied to an engine that injects fuel directly into the cylinder bores (combustion chambers 5) from injection valves arranged near the intake valves 6a, 6b. As another option, the present invention may be applied to an engine that performs lean combustion and stoichiometric combustion.

(4) In the illustrated embodiment, helical type intake ports are employed to produce swirls. However, the swirls do not necessarily have to be produced. In such case, components such as the swirl control valve 17 and the step motor 19 may be eliminated.

(5) The present invention may also be applied to other types of engines such as diesel engines.

Therefore, the present examples and embodiments are to be considered as illustrative and not restrictive and the invention is not to be limited to the details given herein, but may be modified within the scope of the appended claims.

What is claimed is:

1. An apparatus for controlling operation of a fuel injected internal combustion engine of a vehicle, wherein the engine includes a combustion chamber, an air passage for supplying air to the combustion chamber, and an air flow regulator means for regulating the quantity of air supplied for combustion, wherein the engine burns an air-fuel mixture to produce torque, wherein the apparatus comprises:

actuation means for actuating the air flow regulator means based on the driving state of the engine to control the supply of air to the engine;

control means for regulating the air-fuel mixture, wherein the control means prevents an abrupt change in the output torque of the engine by altering the quantity of air supplied to the combustion chamber with the actuation means, wherein the engine operates in at least one mode where the control means controls the actuation means to correct the air-fuel ratio toward a stoichiometric air-fuel ratio, the control means having:

a computer for computing a first correction value that determines the degree of actuation of the actuation means, and the computer changes the first correction value in one manner when the mixture is lean and changes the first correction value in an opposite manner when the mixture is rich; and the computer computes a second correction value based on the value of an average of the first correction values, and the control means controls the actuation means as a function of the first and second correction values.

2. The apparatus as set forth in claim 1, wherein said control means includes a mixture status change detector for detecting when the mixture has changed between a rich status and a lean status, and wherein the computer stores the first correction value in a memory at times when it is determined that the mixture has switched between rich and lean, and wherein the computer computes the second correction value based on the value of the average of the stored first correction values.

3. The apparatus as set forth in claim 2, wherein said engine includes a fuel injection nozzle such that air is mixed with fuel injected from the fuel injection nozzle to create the mixture, and wherein said air flow regulator means includes a throttle valve located in the air passage to adjust the amount of air flowing in the passage.

4. The apparatus as set forth in claim 3, wherein the control means controls the degree of opening of the throttle valve as a function of the first and second correction values.

5. The apparatus as set forth in claim 3, wherein an exhaust gas recirculation passage for recirculating exhaust gas into the air passage is connected to the air passage, wherein the exhaust gas recirculation passage includes an exhaust gas recirculation valve, and wherein the air flow regulator means includes the exhaust gas recirculation valve.

6. The apparatus as set forth in claim 2, further comprising an electric control unit for forming the control means.

7. An apparatus for controlling operation of an internal combustion engine of a vehicle, wherein the engine includes a combustion chamber, an air passage for supplying air to the combustion chamber, a fuel injector for supplying fuel to the combustion chamber, and an air flow regulator means for regulating the quantity of air supplied for combustion, wherein said engine burns an air-fuel mixture to produce torque, said engine having at least a first mode of combustion wherein combustion occurs while the air flow regulator means is held in a substantially fully open position to produce a lean air-fuel mixture, said apparatus comprising:

a sensor device for detecting the nature of the air-fuel ratio of the mixture;

means for judging whether the mixture is rich or lean based on the detection of the sensor device;

feedback means, working in cooperation with the means for judging, for controlling the air flow regulator means in a second mode of operation such that the air-fuel ratio is corrected toward a stoichiometric air-fuel ratio, wherein the first and second modes of operation are selected based on the operating state of the engine, and the feedback means employs a first correction value as a factor in determining a degree of correction required for the air flow regulator means, the apparatus includes learning means for learning a second correction value which increases or decreases depending on a value of an average of the first correction values, and the learning means employs the second correction value as a factor in determining the degree of the correction required for the air flow regulator means.

8. The apparatus according to claim 7, wherein the apparatus includes an estimator for estimating when the state of the mixture has switched between rich and lean, and wherein the apparatus stores the currently employed first correction value at times when the mixture is estimated to have switched between rich and lean, and wherein the apparatus includes an averager for determining the average of at least two of the stored first correction values.

9. A method for controlling an internal combustion engine, comprising the steps of:

mixing air with fuel to be burned in a combustion area of the engine;

judging the nature of the air-fuel mixture to be burned; and in at least one mode of operation of the engine, feedback controlling the air-fuel ratio of the mixture to steer the air-fuel ratio of the mixture towards a stoichiometric target air-fuel ratio by altering the quantity of air entering the combustion area, the at least one mode of operation further comprising the steps of:

computing a first correction value, which is representative of the degree of richness or leanness of the mixture;

computing a second correction value, which is representative of a deviation from a stoichiometric value of the first correction value; and determining the position of a throttle valve as a function of both correction values.

10. The method of claim 9, including the steps of:

operating the engine in a first mode wherein a throttle valve is held substantially fully open to produce a lean mixture; and performing the feedback control in a second mode of operation, wherein the first mode and the second mode are selectively chosen depending on the running condition of the engine.

11. The method according to claim 9, wherein the step of judging includes determining whether the mixture is rich or lean, the method further including the steps of:

changing the first correction value by a predetermined amount if it is determined that the mixture is lean; and changing the first correction value in a manner that is opposite to the change when the mixture is lean if it is determined that the mixture is rich.

12. The method according to claim 11, including the steps of:

i. estimating times at which the mixture has changed between rich and lean;

ii. storing values of the first correction value at the times when the mixture is estimated to have changed between rich and lean;

iii. computing an average of at least two of the stored first correction values;

iv. employing a second correction value, wherein the second correction value is changed by a predetermined amount if the average is less than a first predetermined reference value;

v. changing the second correction value in an opposite manner to the change of step iv. if the average is more than a second reference value.

13. The method of claim 9, including the steps of:

operating the engine in one of a plurality of modes, one of which is selected based on the operating state of the engine;

judging whether the engine is to operate in a lean combustion mode, wherein the torque requirements are low, or a stoichiometric mode, wherein the torque requirements are relatively higher; and performing the feedback control of the air-fuel ratio when it is determined that the engine is to operate in the stoichiometric mode.

14. The method of claim 13, including the step of holding a throttle valve in a substantially fully open position when it is determined that the engine is to operate in the lean mode.

15. The method of claim 9, wherein the step of feedback controlling air-fuel ratio includes the step of altering the position of an exhaust recirculation valve.

* * * * *